(12) United States Patent
Sakai

(10) Patent No.: US 6,231,478 B1
(45) Date of Patent: May 15, 2001

(54) METHOD AND SYSTEM FOR CONTROLLING ENGINE IDLE REVOLUTION NUMBER

(75) Inventor: Yutaka Sakai, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/496,337

(22) Filed: Feb. 2, 2000

(30) Foreign Application Priority Data

Sep. 10, 1999 (JP) .................................................. 11-257303

(51) Int. Cl.$^7$ ....................................................... F02D 1/00
(52) U.S. Cl. .................................................................. 477/111
(58) Field of Search ..................................... 477/111, 112, 477/113

(56) References Cited

U.S. PATENT DOCUMENTS

| 5,048,372 | * | 9/1991 | Sodeno et al. ................. | 477/112 |
|---|---|---|---|---|
| 5,050,453 | * | 9/1991 | Yamaguchi ..................... | 477/111 |
| 5,794,262 | * | 8/1998 | Robinson ....................... | 477/111 |
| 5,833,572 | * | 11/1998 | Leising et al. ................. | 477/111 |
| 6,106,432 | * | 8/2000 | Nishida ......................... | 477/111 |

FOREIGN PATENT DOCUMENTS

H5-280400  10/1993  (JP) .

* cited by examiner

*Primary Examiner*—Dirk Wright
(74) *Attorney, Agent, or Firm*—Sughrue, Mion, Zinn, Macpeak & Seas, PLLC

(57) ABSTRACT

In order to present the generation of spouting up of the engine revolution number and the like, compensation of the bypass air quantity is carried out depending on the driving load during the running range being positioned, and the solenoid valve 6 serving as the intake air control valve provided within the bypass passage is controlled depending on thus compensated bypass air quantity.

6 Claims, 6 Drawing Sheets

FIG.6(a)
SHIFT POSITION OF AUTOMATIC TRANSMISSION
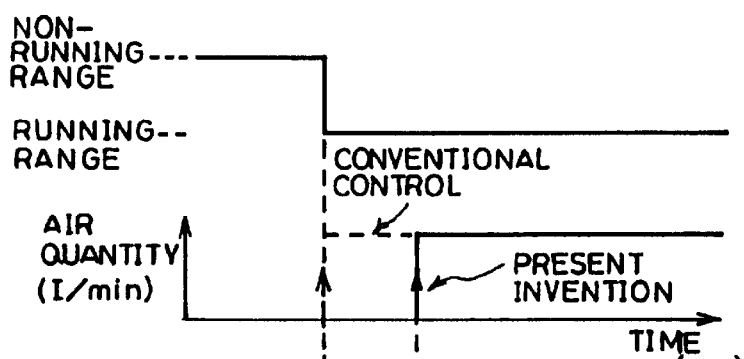
FIG.6(b)
IDLE UP BYPASS AIR QUANTITY $Q_D$ AT THE TIME OF RUNNING RANGE
FIG.6(c)
AUTOMATIC TRANSMISSION TURBINE REVOLUTION NUMBER $N_T$
OUTPUT SHAFT REVOLUTION NUMBER $N_b$
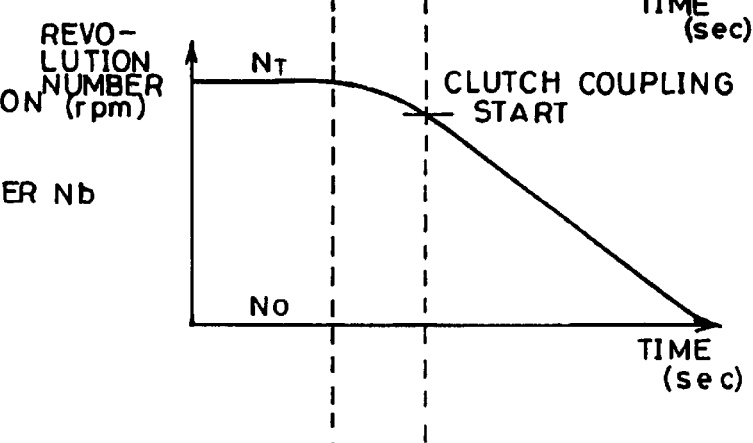
FIG.6(d)
ENGINE REVOLUTION NUMBER $N_e$
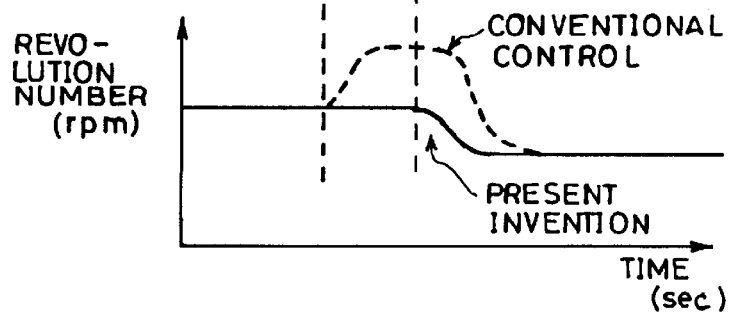

METHOD AND SYSTEM FOR CONTROLLING ENGINE IDLE REVOLUTION NUMBER

BACKGROUND OF THE INVENTION

1. Field of the Invention

The present invention relates to a method and a system for controlling idle revolution number of an engine depending on a state of a driving load of an automatic transmission.

2. Description of the Prior Art

As to a conventional system for controlling engine revolution number, an idle revolution number control in due consideration of effects of state of load of an automatic transmission exerted on the engine driving condition is being carried out, as disclosed in the Japanese Publication Patent No. H02-057211, by setting an idle target revolution number using informations such that whether the shift position of the automatic transmission is in nonrunning range or in running range upon carrying out detection of position of shift lever of the automatic transmission.

Now, the hydraulic automatic transmission carries out the speed change control by controlling the oil pressure within the automatic transmission, and then, if delivery power of an oil pump happens to change due to change of engine revolution number and oil temperature and the like, time required for speed change too changes. In the case where the delivery power of the oil pump is lowered that is seen, for example, when the engine revolution number is low due to an extremely high temperature or an extremely low temperature, the time required for speed change operation becomes long and therefore, there was a problem to produce a time delay until completion of actual speed change from the time when the shift position of the automatic transmission is changed.

This is to say that because, in the conventional idle revolution number control system, judgement of whether the driving load exists or not is made based on whether the shift lever position is in running range or nonrunning range, that system can not cope with the time discrepancy between the timing of shift lever position change from being changed to the nonrunning range to the running range and that of actual clutch cloupling of the automatic transmission, and thus there was a case where a spouting up of the engine revolution number was induced.

As a measure against this situation, for example according to Japanese Laid-Open Patent Application No. H05-280400, an arrangement is made such that the idle target revolution number is changed with a delay by a predetermined time, which is decided depending on oil temperature of an automatic transmission, from the time when the shift position is changed from nonrunning range to running range.

However, even if an arrangement is made such that the idle revolution number is maintained to the target idle revolution number of nonrunning range within a predetermined time, which is decided depending on the oil temperature of the automatic transmission, from the time when the shift position is changed from the nonrunning range to the running range as disclosed by the prior art as given above, due to the fact that the control factor is the oil temperature only, there was a problem such that any countermeasure could not be devised when delivery power changes were to be caused by factors other than the oil temperature.

The present invention has been made to solve the foregoing problems and provides method and system of an idle revolution number control system being capable of preventing a spouting up of engine revolution number caused by unmatched condition between the shift position change of the automatic transmission and the change of actual condition of driving load.

SUMMARY OF THE INVENTION

The method of controlling idle revolution number of an engine according to claim 1 characterized in that when a shift position of an automatic transmission is changed from a nonrunning range to running range, a starting timing of a clutch coupling of an automatic transmission is detected and, when the clutch coupling starting is detected, quantity of bypass air flowing through a bypass passage of a throttle valve being provided in an air intake passage for supplying air to the engine is controlled so as to control the idle revolution number.

The control system of idle revolution number of an engine according to claim 2 comprises a means for detecting a starting timing of a clutch coupling of said automatic transmission when the shift position is changed from a nonrunning range to a running range, a means for setting a bypass air compensation quantity at the timing when the starting timing of the clutch coupling is detected depending on a driving load condition during the running range positioned and carrying out compensation of the bypass air quantity by the bypass air compensation quantity and also carrying out control of the intake air control valve depending on the compensated bypass air quantity.

The control system of idle revolution number for an engine according to claim 3 comprises a means for detecting a starting timing of a clutch coupling of the automatic transmission when the shift position is changed from a nonrunning range to a running range, a means for setting a first target revolution number when the shift position is in the nonrunning range and maintaining the engine revolution number to the first target idle revolution number and a means for setting a second target idle revolution number when the shift position is in the running range and for controlling the idle revolution number so as to, when the shift position is changed from the nonrunning range to the running range, maintain the engine revolution number to the first target idle revolution number until the starting timing of the clutch coupling is detected and maintain the engine revolution number to the second target idle revolution number from the time when the starting timing of the clutch coupling is detected.

The control system of idle revolution number of an engine according to claim 4 is constituted by incorporating, into the control system according to claim 2, a means for detecting engine revolution number, a means for setting a first target revolution number when the shift position is in the nonrunning range and maintaining the engine revolution number to the first target idle revolution number and a means for setting a second target idle revolution number when the shift position is in the running range and for controlling the idle revolution number so as to, when the shift position is changed from the nonrunning range to the running range, maintain the engine revolution number to the first target idle revolution number until the starting timing of the clutch coupling is detected and maintain the engine revolution number to the second target idle revolution number from the time when the starting timing of the clutch coupling is detected.

The control system of idle revolution number of an engine according to claim 5 comprises a means for detecting cooling water temperature and the control system is constructed so that a compensation quantity of the bypass air is set at the time when the shift position of the automatic transmission is in running range depending on the detected cooling water temperature.

The control system of idle revolution number of an engine according to claim 6, comprises a means for detecting engine revolution number, a means for detecting oil temperature of the automatic transmission, a means for controlling oil pressure within the automatic transmission depending on the engine revolution number and the detected oil temperature and a means for controlling timing of the clutch coupling of the automatic transmission by means of the oil pressure control.

BRIEF DESCRIPTION OF THE ACCOMPANYING DRAWINGS

FIGS. 6(a), (b), (c), and (d) show the behaviors of the shift position change of the automatic transmission, the idleup bypass air quantity $Q_D$ at the time of running range, the clutch coupling timing of the automatic transmission and the engine revolution number Ne.

DETAILED DESCRIPTION OF THE PREFERRED EMBODIMENTS

Subsequently, description of Embodiments of the present invention will be given accompanied with drawings.

Figure 1:
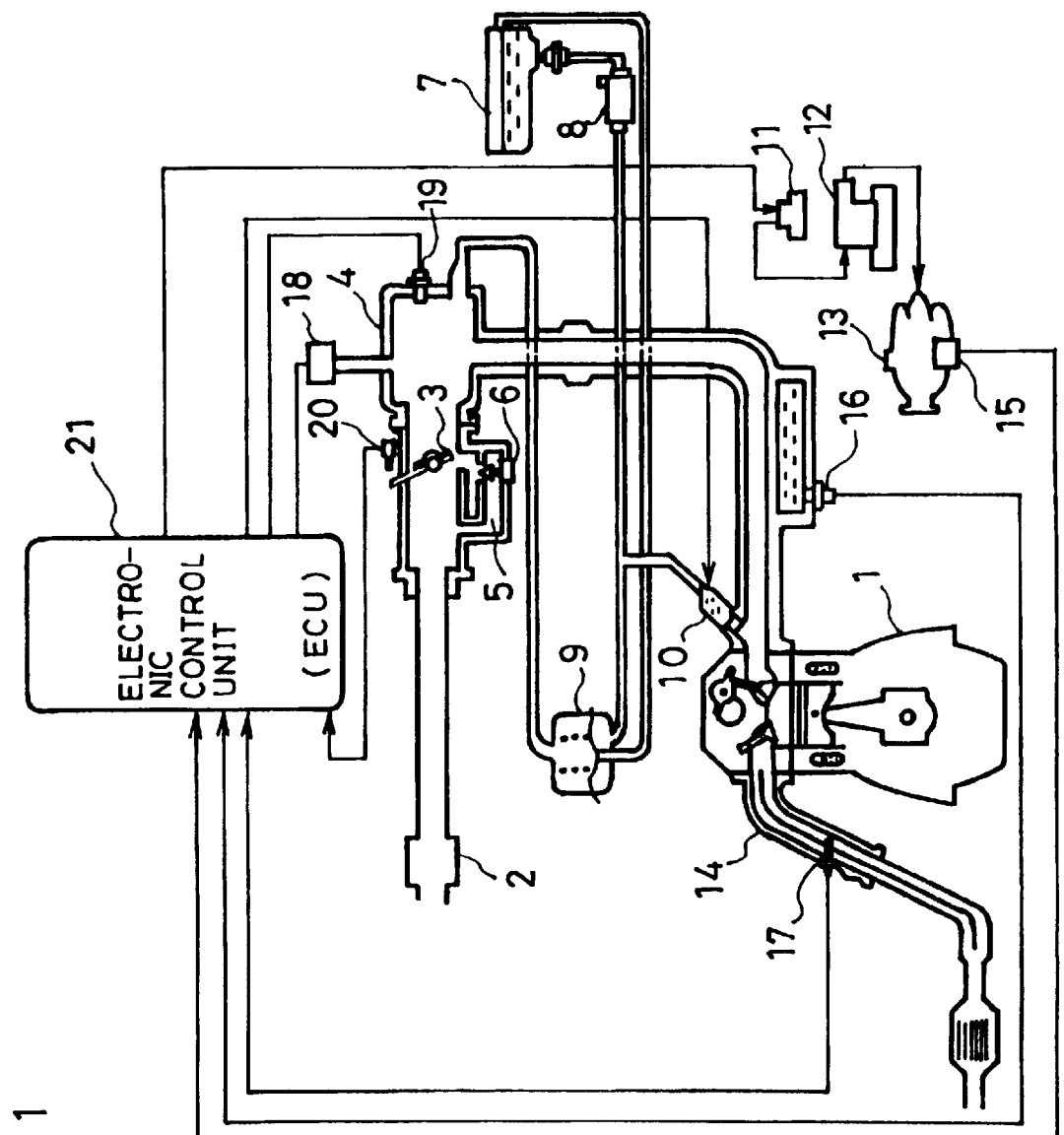
FIG. 1 shows a constitution of the fuel injection control system according to the Embodiment as recited in the present invention.

FIG. 1 shows a constitution of a control system of fuel injection quantity of an engine. In this drawing, 1 is an engine which is, for example, installed in an automobile and sucks air for fuel through successively an air cleaner 2, a throttle valve 3 and a surge tank 4. However, at the time of idling, the throttle valve 3 is closed and also the opening degree of the bypass passage 5 for bypassing the throttle valve 3 is adjusted by the solenoid valve 6 serving as an intake air quantity control valve for controlling bypass air quantity, and the air for combustion thus being dependent on that opening degree is supplied to the engine 1. Also, the fuel, which is delivered by a fuel pump 8 from the fuel tank 7 and which is adjusted to a predetermined pressure by a fuel pressure regulator 7, is fed to the engine 1 through an injectors 10 provided correspondingly to every cylinder of the engine 1.

Further, the ignition signal at the time of ignition is supplied successively to ignition plug being (unshown) provided at each cylinder of the engine 1 through an ignition drive circuit 11, an ignition coil 12 and distributor 13. The exhaust gas after combustion is exhausted to the atmosphere through the manifold 14, etc.

15 is a crank angle sensor for detecting revolution speed of the crank shaft of the engine 1 and outputs a pulse signal having frequency corresponding to the revolution speed, for example, the crank angle signal of a pulse signal consisting of rising up at BTDC 75° and falling down at BTDC 5°. 16 is a cooling water temperature sensor for detecting the temperature of the cooling water of the engine 1, 18 is a pressure sensor being attached to a surge tank 4 and detects the pressure within an intake air pipe with absolute pressure and outputs the pressure detection signal corresponding to the intake air pipe pressure, 19 is a intake air temperature sensor being attached to the surge tank 4 and detects the intake air temperature, 17 is a air fuel ratio sensor being attached to the exhaust manifold 14 and detects the oxygen concentration of the exhaust gas, and 20 is an idle switch for detecting that the throttle valve 3 is closed at the time of idling.

Each detection signal from the sensors 15 through 19 and from the idle switch 20 is supplied to an electronic control unit (hereinafter referred to an ECU) 21. The ECU 21 decides fuel injection quantity depending on the drive condition based on each of aforementioned signals and adjusts the fuel injection quantity by controlling the time interval of opening value of the injector 10. The ECU 21 performs drive control of the ignition driving control 11, too.

Figure 2:
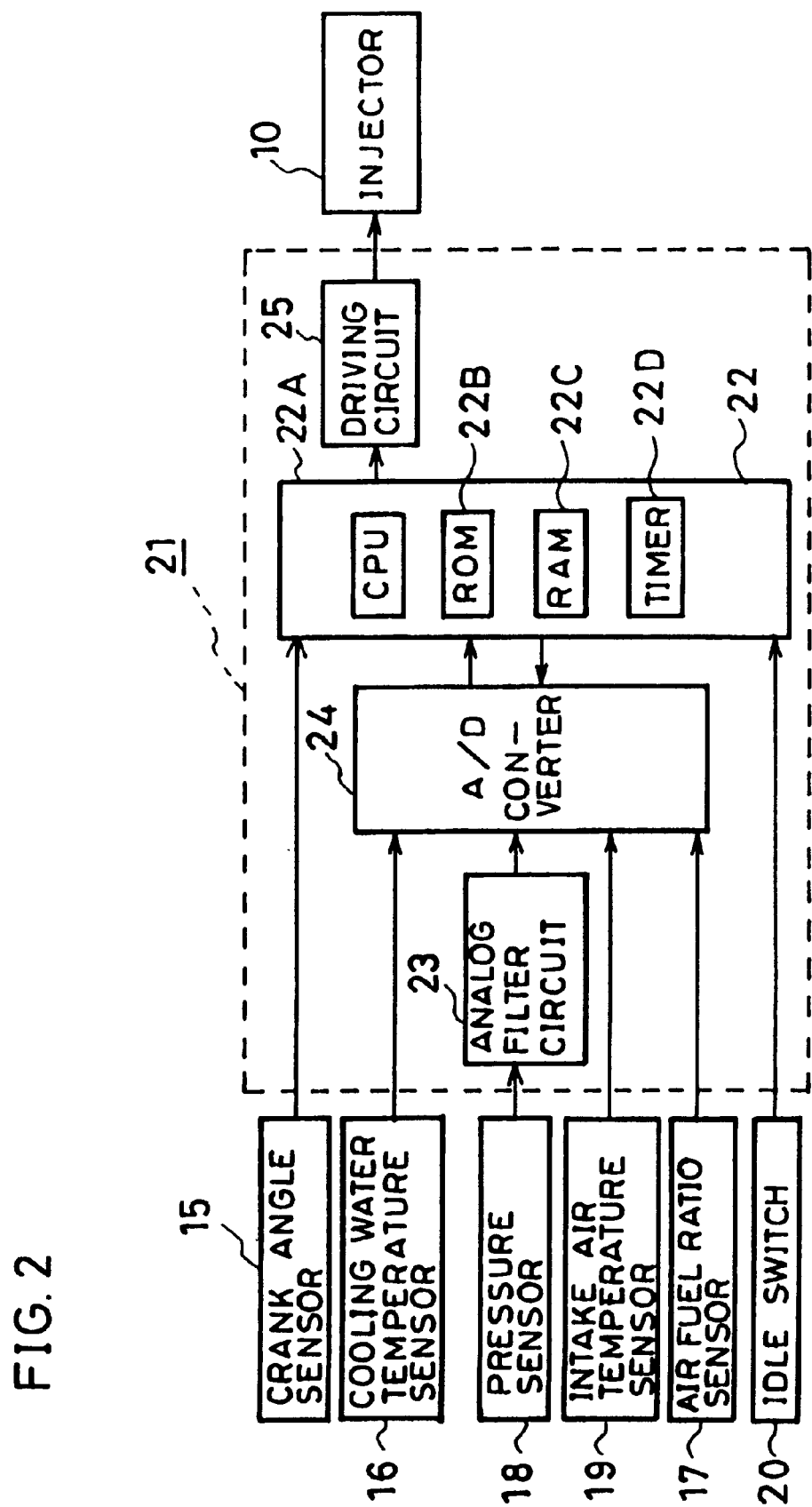
FIG. 2 shows a constitution of the ECU according to the Embodiment as recited in the present invention.

FIG. 2 is a block diagram showing a detailed constitution of the ECU 21 and it comprises a microcomputer 22 for carrying out various operational processes and for making judgements, an analogue filter circuit 23 for reducing ripples of the pressure detection signal from the pressure sensor 18, an A/D converter 24 for converting analogue detection signals from the intake air temperature sensor 19, from the cooling water temperature sensor 16 and from the air fuel ratio sensor 17 and output signal from the analogue filter circuit 23 successively to digital values and a drive circuit 25 for driving the injector 10. Here, only fuel control section is described in the output section.

The microcomputer 22 comprises a CPU22 A for performing various operations and judgements, a ROM 22B for storing flow, etc. in a form of program for controlling idle revolution number as will be described later, RAM 22C serving as a work memory and a timer 22D in which opening time of the injector 10 is preset. The input port (unshown) of the microcomputer 22 is connected to respective output terminals of the crank angle sensor 15, the idle switch 20 and the A/D converter 24 and its output port (unshown) is, in order to send reference signals, connected to the A/D converter 24 and also to the input terminal of the drive circuit 25.

Figure 3:
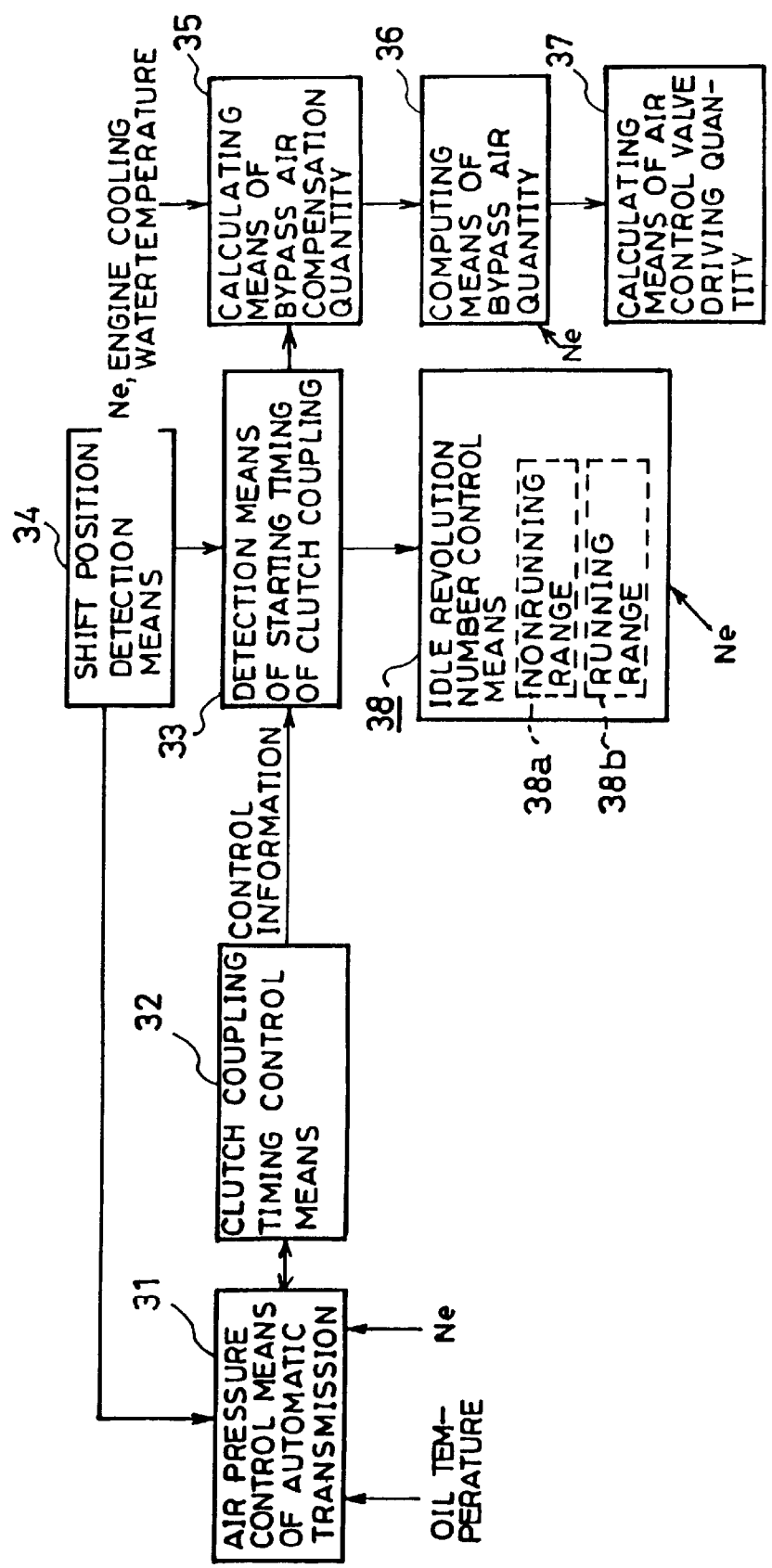
FIG. 3 shows a constitution of the idle revolution number control system according to the present invention.

FIG. 3 shows the constitution of the idle number control system according to the Embodiment and each control means and detection means consist of software of the microcomputer 22 within ECU21. In this drawing, as far as concerning the engine revolution number detection means for detecting revolution number of the engine 1 based on the crank angle signal from the crank angle sensor 15, in order to make easily understandable, only the output signal Ne of the engine revolution number means is entered.

In this drawing, 31 is a oil pressure control means for controlling the oil pressure within the automatic transmission depending on the oil temperature information from the unshown oil temperature detection means and the engine revolution number Ne, 32 is a clutch coupling timing control means for controlling clutch coupling timing of the automatic transmission by the oil pressure control carried out by the oil pressure control means 31, 33 is a clutch coupling starting timing detection means for detecting the timing of the starting of coupling based on the control information from the clutch coupling timing control means 32 when the shift change signal is input from the shift position detection means 34 for detecting the shift position of the automatic transmission, 35 is a bypass air compensation quantity calculation means for setting compensation quantity of the bypass air dependent to the driving load during the running range positioned, 36 is a bypass air quantity calculation means for compensating the bypass air quantity by using the bypass air compensation quantity as mentioned above depending on the engine cooling water temperature from the cooling water temperature sensor 16 and the engine revolution number Ne, and 37 is an air control valve driving quantity calculation means for controlling the solenoid valve 6 serving as an intake air quantity control valve depending on the bypass air quantity which is computed mentioned as above. 38 is an idle revolution number control means consisting of nonrunning range idle revolution number control means 38a, which sets, at the time when the shift position of the automatic transmission is in nonrunning range, a first target engine revolution number depending on the engine revolution number Ne and which maintains the engine revolution number to the first target idle revolution number; and a running range idle revolution number control means 38b which sets, at the time when the shift position is in running range, a second target idle revolution number and which, at the time when the shift position is changed from the nonrunning range to the running range, maintains the engine revolution number Ne to the first target idle revolution number until the clutch coupling starting timing is detected and maintains the same to the second target idle revolution number from the time when the clutch coupling starting timing is detected.

Next, method of controlling the idle revolution number by the microcomputer 22 stored within the ECU21 will be described based on the flow chart 4.

First, at the step S101, the engine revolution number Ne corresponding to the actual revolution number of the engine 1 is computed from the pulse period of the crank angle sensor 15 computed by, for example, unshown interruption routine (engine revolution number detection means) and advances to the step S102. At the step S102, judgement whether the shift position is in the running range or not is made and if the position is in running range, advances to the step S103 and judgement of the clutch coupling condition is made.

By deciding the clutch coupling timing of the automatic transmission and carrying out control by itself on the basis of the engine revolution number Ne and the oil pressure within the automatic transmission by unshown interruption routine, the foregoing judgement of the state of clutch coupling can be easily made by using the informations mentioned as above. Concretely, a synthetic judgement is made by using informations such as variation of oil pressure within the automatic transmission and decreasing tendency of the actual revolution number of the engine 1 caused by the clutch coupling.

When judgement is made that the clutch is coupled, driving load of the automatic transmission is considered to be loaded and advances to the step S104. At the step S104, by using the idleup bypass air quantity $Q_D$, which is the bypass air compensation quantity at the time of running range being positioned depending on driving load of the automatic transmission, set the value being computed depending on the engine cooling water temperature by unshown subroutine and advances to the step S105. At the step 105, by using the revolution number, which is computed depending on the other engine driving states, as the target revolution number Nt at the time when the nonrunning range is positioned, and advances to the step S108.

On the other hand, when the shift position is in the nonrunning range at the step S102, or when judgement that the clutch is not coupled is made at step S103, it is judged that the driving load of the automatic transmission is not loaded to the engine, advances to the step 106. At the step 106, since it is judged that driving load of the automatic transmission is not produced at the step S101, putting the idleup bypass air quantity $Q_D$ at the time of the running range being positioned to be zero, advances to the step S107. At the step S107, by putting the revolution number being computed depending on the other engine driving condition as the target revolution number Nt during the nonrunning range positioned, advances to the step S108.

At the step S108, whether in the state of idle or not is judged from the idle switch 20 and from the input states of unshown vehicle speed sensor, and if the state is not idle, advances to the step S111; if the state is idle, at the step 109, judgement of whether the timing is the predetermined one for computing the revolution number compensation quantity $Q_{NFB}$ or not is made, and if the timing is not the predetermined one, advances to the step S111; and if the timing is the predetermined one, at the step S110 computing the feedback revolution number compensation quantity $Q_{NFB}$ depending on the difference between the engine revolution number Ne, which is the actual engine revolution number, and the target revolution number Nt, and advances to the step S111.

At the step S111, the air quantity $Q_{ETC}$ depending on the engine drive condition and at the step S112, the control air quantity $Q_{ISC}$ is obtained by summing up the air quantity $Q_{ETC}$ being computed at the step S111 and the idleup bypass air quantity $Q_D$ during the time of running range being positioned, being computed at the step S104 or at the step S105, and the revolution number compensation quantity $Q_{NFB}$ being computed at the step S110. At the step 113, air control valve drive quantity D (e.q. driving duty of the solenoid valve 6) is computed from the control air quantity $Q_{ISC}$ being computed at the step S112, and the idle revolution number control routine is terminated.

Figure 4:
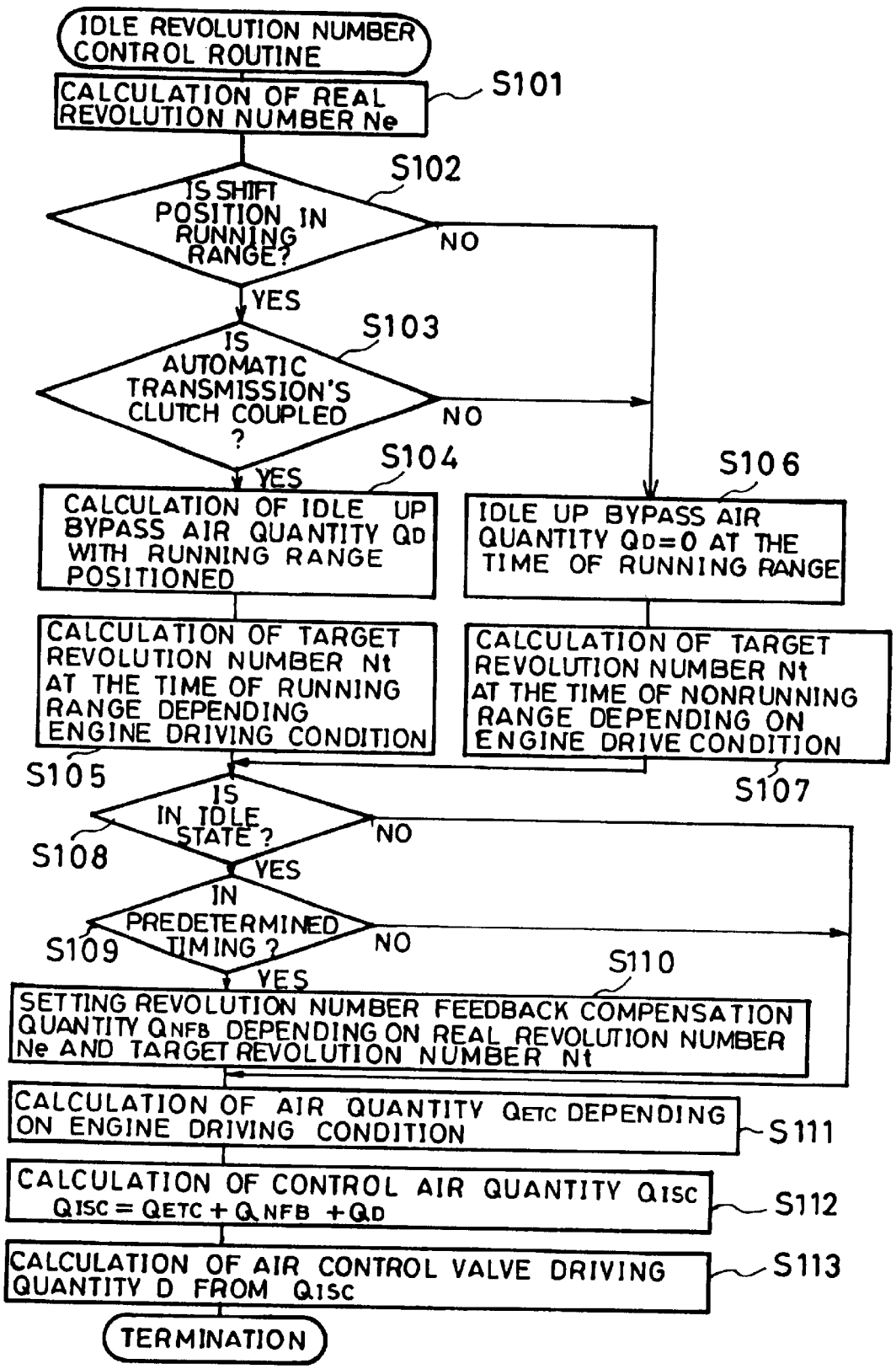
FIG. 4 is a flow chart showing the operation of the idle revolution number control system according to the present invention.
Figure 5:
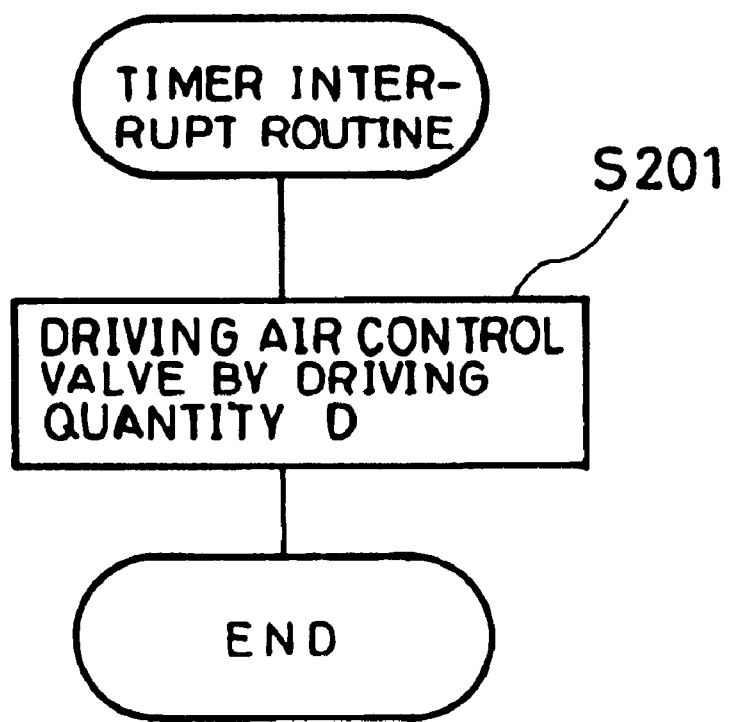
FIG. 5 is a flow chart showing the operation of the idle revolution number control system according to the present invention.

Further, as shown by FIG. 5, the timer interruption routine is started every time when the predetermined time lapses, and the bypass air quantity is controlled (step S201) by driving the solenoid valve 6 based on the air control valve quantity D being computed at the step S113, as shown in FIG. 4 and the timer interruption routine is terminated.

Next, description on the control method of idle revolution number at the time of extremely low temperature in the fuel injection quantity control system according to the Embodiment will be given referring to FIGS. 6 (a), (b), (c) and (d). Drawing (a) shows a state of the shift position of the automatic transmission under the condition of vehicle stoppage, and drawings (b)–(d) show respective behaviors of the compensation quantity of the idleup bypass air quantity $Q_D$, the turbine revolution number $N_T$ and the output revolution number $N_o$ of the automatic transmission and the engine revolution number Ne. Now, as to the idleup bypass air quantity $Q_D$ during the running range positioned in Drawing (b) and the engine revolution number Ne in Drawing (d), the broken line indicates the conventional control and the real line indicates the control according to the present invention.

Because at an extremely law temperature the delivery power of the oil pump is lowered, a time delay is developed until the turbine revolution number $N_T$ begins to fall down, which follows actual starting of the clutch coupling from the time when the shift position of the automatic transmission is changed. Since in the conventional control the idleup air bypass air quantity $Q_D$ during the running range positioned is set simultaneously with the change of the shift position to the running range, the intake air quantity is obliged to increase prior to generation of actual load as indicated by the broken likes in Drawing (b) and, as and, as a result, the engine revolution number Ne is spouted up as shown by Drawing (d).

Comparing with the conventional control as above, according to the present invention as aforementioned, not at the timing of the shift position change but at the clutch coupling timing (e.g. the timing at the time when the turbine revolution number $N_T$ of the automatic transmission decreases by 20%) as show by Drawing (c), the idleup bypass air quantity $Q_D$ during the running range positioned is arranged to be set and hence, the air quantity in compliance with the load applied to the engine can be supplied certainly. Accordingly, as indicated by the real lines in Drawing (d), the spouting up of the engine revolution number Ne can be suppressed.

Now, in the Embodiment as above, the air quantity compensation during idling is exemplified and yet, it is clear that for other control, such that the control is separated with respect to running range being positioned or nonrunning position being positioned, too, switching of control accurately responding to the loading state of the automatic transmission can be carried out.

As aforementioned, according to the invention as recited in claim 1, when a shift position of an automatic transmission is changed from a nonrunning range to a running range, a starting timing of a clutch coupling of an automatic transmission is detected and, when the clutch coupling starting is detected, quantity of bypass air flowing through a bypass passage of a throttle valve being provided in an air intake passage for supplying air to an engine is controlled so as to control the idle revolution number; and as a result, even when a discrepancy appears between timing of the shift position changing and that of the clutch coupling, the control air with quantity depending on the load condition of the automatic transmission can be supplied and stable idle revolution number control is enabled.

According to the invention as recited in claim 2, the control system of idle revolution number of an engine comprises a means for detecting a starting timing of a clutch coupling of the automatic transmission, a means for setting a bypass air compensation quantity at the time when the starting timing of said clutch coupling is detected depending on a driving load condition during the running range positioned and carrying out compensation of the bypass air quantity by the bypass air compensation quantity and also carrying out control of the intake air control valve depending on the bypass air quantity, and the timing at the time when the driving load is changed is arranged to be judged through detection of the timing at the time when the clutch coupling of the automatic transmission is actually started; therefore, the bypass air with a quantity, which is accurately compliance with the timing of the load change of the automatic transmission, can be supplied without being affected by outer disturbances such as the oil temperature and the engine revolution number.

Accordingly, even when the delivery power of the oil pump is lowered which likely occurs in a case where the engine revolution number is low at the time when the temperature is extremely high or extremely low, the bypass air with accurate quantity can be supplied without being influenced by the delay of clutch coupling of the automatic transmission and thus, behavior at the time of shift position change can be stabilized and a stable idle revolution number control can be attained.

Accordingly to the invention as recited in claim 3, the control system of idle revolution number of an engine comprises a means for setting a first target revolution number when the shift position is in the nonrunning range and maintaining the engine revolution number to the first target idle revolution number and a means for setting a second target idle revolution number when the shift position is in the running range and for controlling the idle revolution number so as to, when the shift position is changed from the nonrunning range to the running range, maintain the engine revolution number to the first target idle revolution number until the starting timing of the clutch coupling is detected and maintain the engine revolution number to the second target idle revolution number from the time when the starting timing of the clutch coupling is detected; therefore, the target idle revolution number can be controlled depending on the clutch coupling condition.

The control system of idle revolution number of an engine according to claim 4 is constituted by incorporating, into the control system according to claim 2, a means for detecting engine revolution number, a means for setting a first target revolution number when the shift position is in the nonrunning range and maintaining the engine revolution number to the first target idle revolution number and a means for setting a second target idle revolution number when the shift position is in the running range and for controlling the idle revolution number so as to, when the shift position is changed from the nonrunning range to the running range, maintain the engine revolution number to the first target idle revolution number until the starting timing of the clutch coupling is detected and maintain the engine revolution number to the second target idle revolution number from the time when the starting timing of the clutch coupling is detected; therefore, the bypass air with a quantity accurately in compliance with the timing of the clutch coupling change of the automatic transmission can be supplied and also control of the target idle revolution number can be made depending on the clutch cloupling condition.

According to the invention as recited in claim 5, since the control system comprises a means for detecting cooling water temperature and a compensation quantity of the bypass air at the time when the shift position of the automatic transmission is in running range is set depending on the detected cooling water temperature and therefore, quantity of the bypass air can be controlled accurately regardless of temperature of the cooling water.

According to the invention as recited in claim 6, since the control system comprises a means for controlling oil pressure within the automatic transmission depending on the engine revolution number and the detected oil temperature and a means for controlling timing of the clutch coupling of the automatic transmission by means of the oil pressure control and thus the and starting timing of the clutch coupling is enabled to be detected and starting timing of the clutch coupling can be acquired accurately.

What is claimed is:

1. A method of controlling idle revolution number of an engine, wherein when a shift position of an automatic transmission is changed from a nonrunning range to a running range, a starting timing of a clutch coupling of an automatic transmission is detected and, when said clutch coupling starting is detected, quantity of bypass air flowing through a bypass passage of a throttle valve being provided in an air intake passage for supplying air to said engine is controlled so as to control said idle revolution number.

2. A control system of idle revolution number of an engine comprising an automatic transmission, a detection means for detecting a shift position of said automatic transmission, an intake air quantity control valve for controlling quantity of bypass air flowing through a bypass passage of a throttle valve being provided in an intake air passage for supplying air to said engine and means for setting quantity of said bypass air flowing through said bypass depending on driving condition of an engine, wherein said control system comprises a means for detecting a starting timing of a clutch coupling of said automatic transmission when said shift position is changed from a nonrunning range to a running range, a means for setting a bypass air compensation quantity at the time when said starting timing of said clutch coupling is detected depending on a driving load condition during said running range positioned and carrying out compensation of said bypass air quantity by said bypass air compensation quantity and also carrying out control of said intake air control valve depending on said compensated bypass air quantity.

3. A control system of idle revolution number of an engine comprising an automatic transmission, a means for detecting a shift position of said automatic transmission and a means for detecting an engine revolution number, wherein said control system comprises a means for detecting a starting timing of a clutch coupling of said automatic transmission when said shift position is changed from a nonrunning range to a running range, a means for setting a first target revolution number when said shift position is in said nonrunning range and maintaining said engine revolution number to said first target idle revolution number and a means for setting a second target idle revolution number when said shift position is in said running range and for controlling said engine revolution number so as to, when said shift position is changed from said nonrunning range to said running range, maintain said engine revolution number to said first target idle revolution number until said starting timing of said clutch coupling is detected and maintain said engine revolution number to said second target idle revolution number from the time when said starting timing of said clutch coupling is detected.

4. A control system of idle revolution number of an engine according to claim 2, wherein said control system comprises a means for detecting engine revolution number, a means for setting a first target revolution number when said shift position is in said nonrunning range and maintaining said engine revolution number to said first target idle revolution number and a means for setting a second target idle revolution number when said shift position is in said running range and for controlling said idle revolution number so as to, when said shift position is changed from said nonrunning range to said running range, maintain said engine revolution number to said first target idle revolution number until said starting timing of said clutch coupling is detected and maintain said engine revolution number to said second target idle revolution number from the time when said starting timing of said clutch coupling is detected.

5. A control system of idle revolution number of an engine according to claim 2, wherein said control system comprises a means for detecting cooling water temperature and a compensation quantity of said bypass air is set at the time when said shift position of said automatic transmission is in running range depending on said detected cooling water temperature.

6. A control system of idle revolution number of an engine according to claim 2, wherein said control system comprises a means for detecting engine revolution number, a means for detecting oil temperature of said automatic transmission, a means for controlling oil pressure within said automatic transmission depending on said engine revolution number and said detected oil temperature and a means for controlling timing of said clutch coupling of said automatic transmission by means of said oil pressure control.

* * * * *